J. R. MOUSLEY.
SHOCK ABSORBER FOR MOTOR CARS.
APPLICATION FILED SEPT. 6, 1917.
1,269,730.
Patented June 18, 1918.
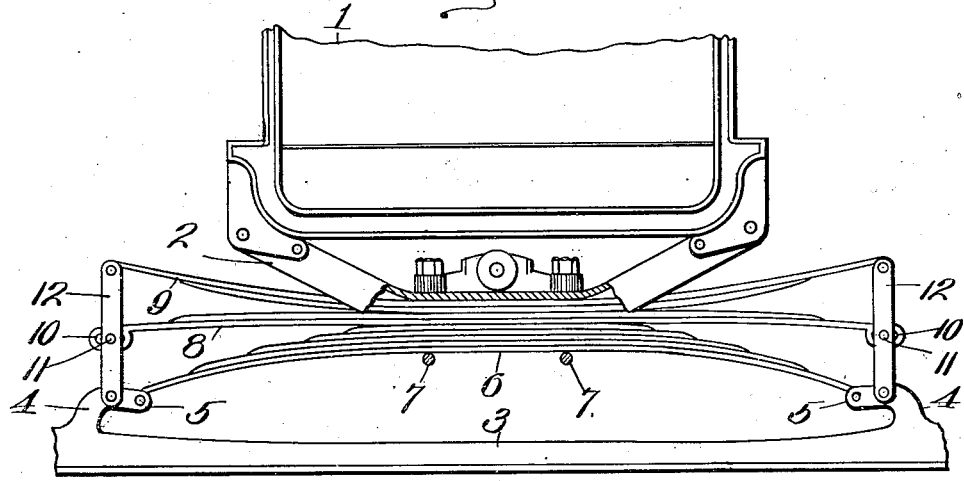
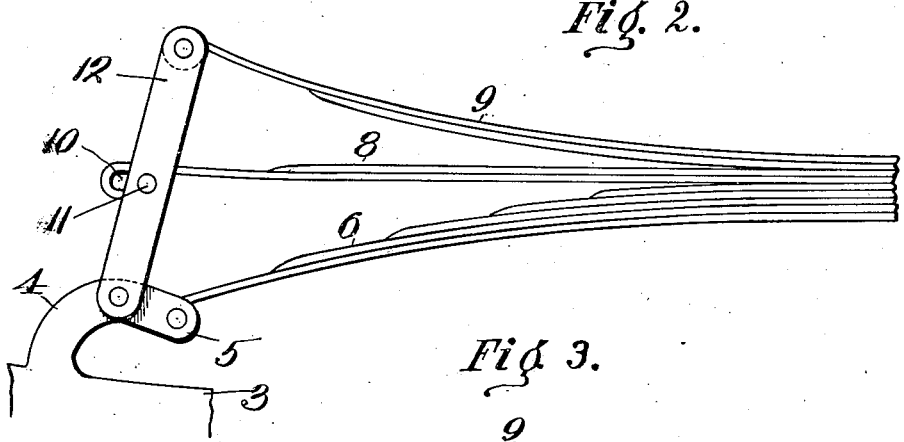
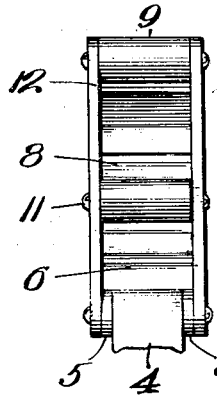
Inventor
J. R. Mousley,
By George A. Thorpe
Attorney

UNITED STATES PATENT OFFICE.

JOHN R. MOUSLEY, OF KANSAS CITY, MISSOURI.

SHOCK-ABSORBER FOR MOTOR-CARS.

1,269,730.   Specification of Letters Patent.   Patented June 18, 1918.

Application filed September 6, 1917. Serial No. 190,275.

*To all whom it may concern:*

Be it known that I, JOHN R. MOUSLEY, a citizen of the United States, and a resident of Kansas City, in the county of Jackson and State of Missouri, have invented certain new and useful Improvements in Shock-Absorbers for Motor-Cars, of which the following is a specification.

This invention relates to shock absorbers for motor cars, and is designed more especially for use on cars of that type equipped with transversely extending body supporting springs.

The object of the invention is to make riding more comfortable to the occupants of the car by offering a yielding resistance to and thereby gradual absorption of the upward movements of the body of the car after the same has been caused to move downward suddenly through the passage of the car over irregularities in the roadway, a further object being to provide a shock absorber which will make the car ride easier regardless of the weight of the load.

A still further object is to produce a shock absorbing attachment which can be easily and economically applied in operative position and which is of inexpensive construction.

With the objects named in view the invention consists in certain novel and peculiar features of construction and combinations of parts as hereinafter described and claimed; and in order that it may be fully understood reference is to be had to the accompanying drawing, in which:

Figure 1, is a front view of a part of a motor car equipped with a shock absorber embodying my invention.

Fig. 2, is an enlarged view of a part of the car spring and shock absorber shown by Fig. 1, to approximately indicate the adjustment of certain parts when the body of the car is depressed.

Fig. 3, is an end view of the shock absorber attachment, and one of the supporting springs of a car.

In the said drawing, 1 indicates the radiator at the front end of a car, and 2 the front end of the car frame underlying the radiator and of channel iron form. 3 indicates the front axle, 4 lugs projecting from said axle, 5 links pivoted to and projecting inwardly from said lugs, 6 the front spring pivoted at its ends to links 5 and secured intermediate its ends by clip 7 to the front iron 2, all parts thus far described being found in a well-known make of motor car.

To equip such a car with a shock absorber embodying this invention, springs 8 and 9 are superposed with respect to each other and to spring 6, and extend through the lower part of the channel iron 2 and are secured rigidly thereto and to spring 6, by the clip 7.

The spring 8 is preferably slightly bowed upward and terminates at its ends in a pair of slots 10 through which extend pins 11 forming cross pieces for swing frames or arms 12 pivoted at their lower ends to the lugs 4 co-incidentally with the pivotal points of connection with said lugs of the links 5, and the upper ends of swing frames or arms 12 are pivotally connected to the extremities of spring 9, which it will be noted is a slightly bowed spring and is inverted with respect to spring 6. The tendency of spring 9 is to bow to a greater extent than as shown in Fig. 1, and to swing the swing frames inwardly at their upper ends and hence cause the cross pins 11 to impose downward pressure on the slotted ends of spring 8, reverse or outward swinging movement of frames 12 being resisted by the spring 9. Normally the weight of the body of the car is chiefly imposed on the spring 8, so that said spring shall absorb the slight up and down movements of the body incident to travel upon a smooth roadway. When the car is heavily loaded and also when it rides over a substantial irregularity in the roadway regardless of the load, the spring 8 will yield sufficiently between its ends to cause the supporting spring 6 to yield through the downward and outward movement of the inner ends of the links 5. It will likewise be apparent that each time the body moves downward whether supported almost entirely by spring 8 or whether said spring is substantially reinforced by spring 6, the bow of the spring 9 is increased and hence said spring causes the swing frames to swing inwardly to substantially the position shown in Fig. 2. The reaction of the body following such downward movement and due to the spring 6 chiefly, ordinarily is sharp and quick and tends to bounce the car occupants from the seats thereof. With this absorber, the reaction of the spring and body is yieldingly resisted by the spring 9 due to the fact that said spring must be placed under stress to restore it to the normal position shown by Fig. 1.

The resistance, therefore, of said spring to being restored to the position mentioned, prevents a quick and sudden rebound of the body but permits the latter to move upward less quickly and therefore without any tendency toward unseating the occupants of the car.

The drawing shows the application of the absorber to the front spring, but it will be understood that it is intended likewise for application to the rear spring, and that the construction is substantially the same and the mode of operation identical in both cases.

From the above description it will be apparent that I have produced a shock absorber possessing the features of advantage enumerated as desirable in the statement of the object of the invention, and while I have illustrated and described the preferred embodiment of the invention, it is to be understood that it is susceptible of modification without departing from the principle of construction involved or the spirit and scope of the appended claims.

I claim:

1. The combination in a motor car of the type provided with a transverse body-supporting spring, of a pair of transverse springs rigid at intermediate points with the body-supporting spring, and swing frames pivoted at their lower ends on the axle and at their upper ends to one of the said pair of springs, and having play connections at intermediate points with the ends of the other of said pair of springs.

2. The combination in a motor car of the type provided with a transverse body-supporting spring, of a pair of transverse springs rigid at intermediate points with the body-supporting spring, and swing frames pivoted at their lower ends on the axle and at their upper ends to one of the said pair of springs, and having pin-and-slot connection providing for play transversely of the car, with the other of said pair of springs.

3. The combination in a motor car of the type provided with a transverse body-supporting spring, of a pair of transverse springs rigid at intermediate points with the body-supporting spring, and swing frames pivoted at their lower ends on the axle and at their upper ends to one of the said pair of springs; said other of said pair of springs having longitudinal slots at its ends and said frames at points intermediate their ends having pins engaging the said slots of the last-named spring.

4. In a motor car of the type provided with a transverse body-supporting spring connected by swinging links to the underlying axle of the car, the combination of a pair of superposed springs rigid midway their length with and resting on the body-supporting spring, the upper of said pair of springs being bowed downwardly, and swing frames pivotally connecting the ends of the last-named spring with the axle, the other of said pair of springs having play connection transversely of the car with the said frames at intermediate points thereof and exerting pressure downward thereon to hold the upper spring under stress by yieldingly resisting inward swinging movement of said frames.

In testimony whereof, I affix my signature.

JOHN R. MOUSLEY.